(12) United States Patent
Standing et al.

(10) Patent No.: US 10,204,311 B2
(45) Date of Patent: Feb. 12, 2019

(54) CONFIGURING WORKFLOWS IN A HOST DEVICE OPERATING IN A PROCESS CONTROL SYSTEM

(71) Applicant: BRISTOL, INC., Watertown, CT (US)

(72) Inventors: Iain Standing, Kidderminster (GB); Omer Qadri, Round Rock, TX (US)

(73) Assignee: BRISTOL, INC., Watertown, CT (US)

( * ) Notice: Subject to any disclaimer, the term of this patent is extended or adjusted under 35 U.S.C. 154(b) by 629 days.

(21) Appl. No.: 14/699,928

(22) Filed: Apr. 29, 2015

(65) Prior Publication Data
US 2015/0347935 A1 Dec. 3, 2015

Related U.S. Application Data

(60) Provisional application No. 61/986,806, filed on Apr. 30, 2014.

(51) Int. Cl.
*G06Q 10/06* (2012.01)
*H04L 29/08* (2006.01)
*G05B 19/042* (2006.01)

(52) U.S. Cl.
CPC ....... *G06Q 10/0633* (2013.01); *G05B 19/042* (2013.01); *H04L 67/10* (2013.01); *G05B 2219/31205* (2013.01); *G05B 2219/32128* (2013.01)

(58) Field of Classification Search
CPC ......... G06Q 10/00; G06Q 40/06; G06F 17/60
USPC ....................................................... 705/7.27
See application file for complete search history.

(56) References Cited

U.S. PATENT DOCUMENTS

| | | | | |
|---|---|---|---|---|
| 5,974,392 A | * | 10/1999 | Endo | G06Q 10/063112 705/7.14 |
| 6,424,948 B1 | * | 7/2002 | Dong | G06Q 10/0631 705/7.12 |
| 6,904,161 B1 | * | 6/2005 | Becker | G01S 7/52098 382/128 |
| 7,024,669 B1 | * | 4/2006 | Leymann | G06Q 10/06 705/7.27 |

(Continued)

FOREIGN PATENT DOCUMENTS

| RU | 2005 130 477 A | 4/2006 |
|---|---|---|
| RU | 2 372 636 C2 | 11/2006 |

(Continued)

OTHER PUBLICATIONS

Volker et al "Workflow Management based on Process Model Repositories", IEEE, pp. 379-388 (Year: 1998).*

(Continued)

*Primary Examiner* — Romain Jeanty
(74) *Attorney, Agent, or Firm* — Marshall, Gerstein & Borun LLP

(57) ABSTRACT

In a method of configuring a host device in a process control plant to automatically perform an action or a set of actions includes, a workflow template is generated. The workflow template includes a sequence of one or more steps to be performed by the host device. Each of at least some of the one or more steps is selected from a set of predetermined steps. Then, an instance of the workflow template is generated at the host device. A trigger condition is generated for automatically triggering the instance workflow. The sequence of the one or more steps is executed in response to detecting the trigger condition.

18 Claims, 12 Drawing Sheets

(56) References Cited

U.S. PATENT DOCUMENTS

| | | | |
|---|---|---|---|
| 8,140,373 B2* | 3/2012 | Aron | G06Q 10/06316 |
| | | | 705/7.27 |
| 2005/0268012 A1 | 12/2005 | Schaetzle et al. | |
| 2006/0194351 A1 | 8/2006 | Huang et al. | |
| 2007/0073419 A1 | 3/2007 | Sesay | |
| 2007/0240069 A1 | 10/2007 | Eldridge et al. | |
| 2008/0082180 A1 | 4/2008 | Blevins et al. | |
| 2011/0153051 A1 | 6/2011 | Bachman et al. | |
| 2012/0254291 A1* | 10/2012 | Feldman | G06Q 10/06 |
| | | | 709/203 |
| 2013/0282150 A1 | 10/2013 | Panther et al. | |

FOREIGN PATENT DOCUMENTS

| | | |
|---|---|---|
| RU | 2 415 468 C2 | 3/2009 |
| RU | 2014 146 266 A | 6/2016 |

OTHER PUBLICATIONS

The International Search Report and the Written Opinion of the International Searching Authority, dated Aug. 24, 2015, International Application No. PCT/US2015/028408 (9 pages).

OpenEnterprise™ Online Help—Section Action Engine, available on Jul. 31, 2014 (printed Feb. 2, 2017) (41 pages).

Office Action in Russian Patent Application No. 2016145668, dated Nov. 16, 2018.

\* cited by examiner

CONFIGURING WORKFLOWS IN A HOST DEVICE OPERATING IN A PROCESS CONTROL SYSTEM

FIELD OF THE INVENTION

The present invention relates generally to process plant systems and, more particularly, to configuring server actions in process control and data acquisition systems.

DESCRIPTION OF THE RELATED ART

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as field devices conforming to the well-known Fieldbus protocol may also perform control calculations, alarming functions, and other control functions commonly implemented within the controller. The process controllers, which are also typically located within the plant environment, receive signals indicative of process measurements made by sensors and/or field devices and/or other information pertaining to the field devices and execute a controller application that runs, for example, different control modules that make process control decisions, generate control signals based on the received information and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, a supervisory control and data acquisition system, a distributed control system, a combination thereof, etc. may include a centralized computing device, such as a server and/or a user interface device, which may communicate with controllers, remote terminal units (RTUs) and the like, to collect data from field devices in the process control system, to analyze the data, to affect control of the system (in some cases based on the analysis of the data), to generate alarms, etc. Such host systems, however, often lack flexibility with respect to configuration of the system, such as configuration for performing custom actions that may be required for a specific system at a particular plant. For example, configuring a host system to automatically perform certain actions or sequences of actions in response to a certain change in the system usually requires knowledge of a programming language or a scripting language to create a custom program that may run on the host device, and may also require additional systems and components, such as software development applications, program compilers and the like. Moreover, even if such a custom computer program is created, the program is often not easy to maintain and is even harder to update or expand.

SUMMARY

In one aspect, a method of configuring a host device in a process control plant to automatically perform an action or a set of actions includes generating, at the host device, a workflow template that includes a sequence of one or more steps to be performed by the host device, including selecting each of at least some of the one or more steps from a set of predetermined steps. The method also includes creating, at the host device, an instance of the workflow template at the host device. The method further includes generating, at the host device, a trigger condition to automatically trigger the instance workflow. The method additionally includes detecting the trigger condition. The method also includes executing, at the host computing device, the sequence of the one or more steps in response to detecting the trigger condition.

In another aspect, a process control system comprises a host device configured to communicate with the one or more remote terminal units (RTUs) to one or both of (i) obtain data from the one or more remote terminal units and (ii) transmit data to the one or more RTU. The host device includes a non-transitory computer readable memory that stores a plurality of predefined steps. The host device also includes an action engine configured to generate a workflow template that includes a sequence of one or more steps, selected from the plurality of stored predefined steps, to be performed by the host device. The action engine is also configured to create a workflow instance corresponding to the workflow template. The action engine is also configured to generate a trigger condition to automatically trigger the workflow instance. The action engine is further configured to detect the trigger condition, and initiate execution of the sequence of the one or more steps in response to detecting the trigger condition.

DETAILED DESCRIPTION OF THE DRAWINGS

DETAILED DESCRIPTION

The present disclosure is directed to systems and methods for configuring a host device to perform actions or sequences of actions in a process control system. In particular, routines that facilitate configuration of host devices are disclosed. The routines allow a user to generate workflows that define certain actions or sequences of actions and to define triggering events or conditions for automatically initiating the defined actions or sequences of actions. The system and method enable a user to define a workflow by selecting, from a set of predefined steps, one or more steps to be included in the workflow. The user may also define conditional branches in the workflow, where a particular branch in the workflow is selected during execution of the workflow, based on a result of a previous step of the workflow. The system provides flexibility and business agility by allowing users to quickly and efficiently define and implement process strategies for monitoring and controlling processes in process control environments. Such strategies can be defined and implemented in a process plant by plant personal (e.g., on site) and without knowledge or expertise in a programming or a scripting language. Thus, such strategies can be easily developed and implemented in a plant based on specific plant requirements or based on other considerations, for example to optimize processes or plant operations. Further, automatically initiating the workflows may increase efficiency in operating the plant, for example due to quicker response times to certain events or alarms that may be detected and automatically acted upon (for example to automatically adjust a set-point in a device, to quickly shut-in a process if a shut-in is needed or desired, etc.) by the process control system.

Figure 1:
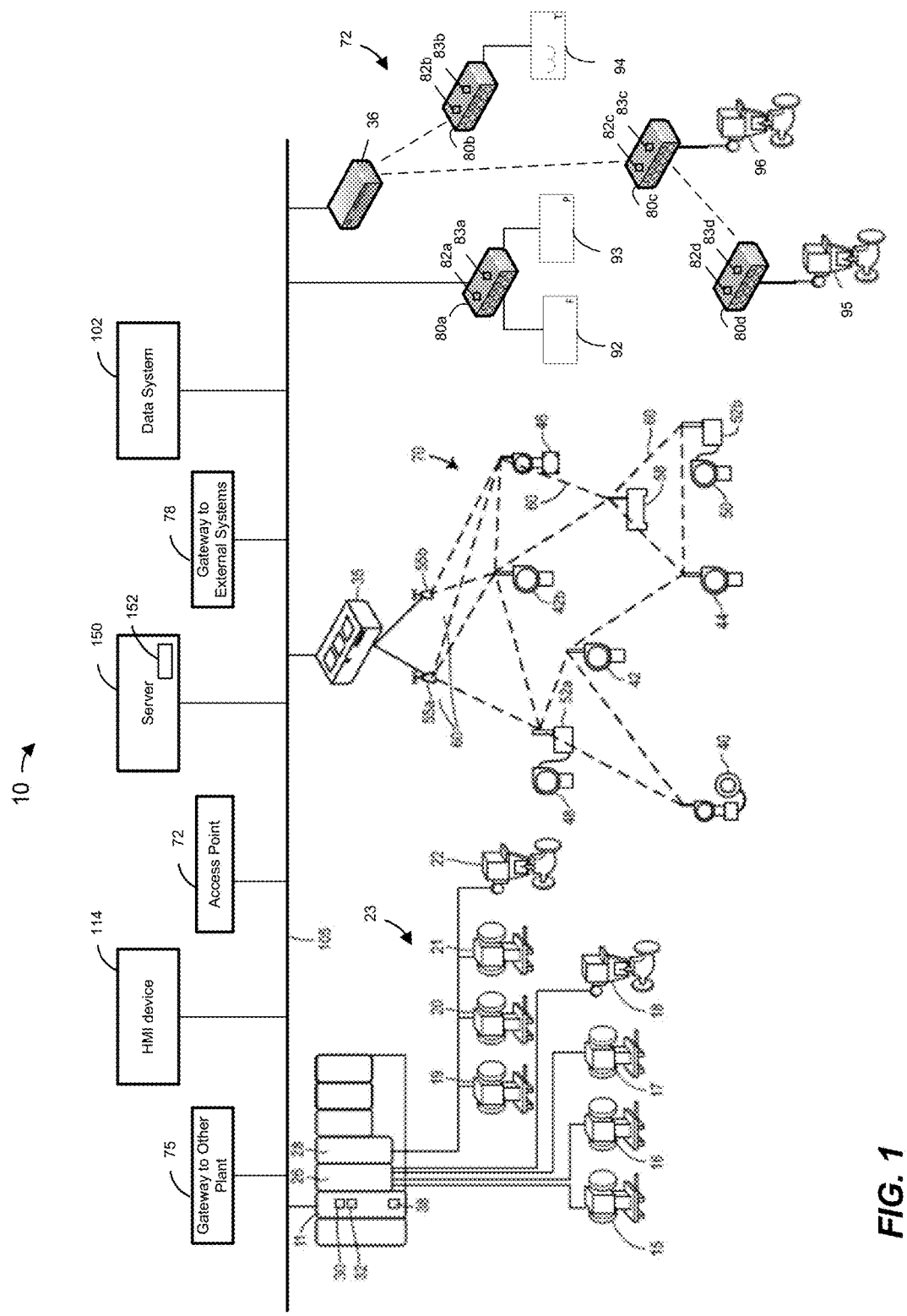
FIG. 1 is a block diagram of an example process plant or process control system that includes a supervisory control and data acquisition system that may be configured to perform automatic actions.

Turning first to the overall architecture of an example process plant, FIG. 1 is a block diagram of an exemplary process control network 100 operating in a process control system or process plant 10. The process control network 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), human interface (HMI) devices 114, servers 150, data systems 102 (e.g., including process databases, historians, etc.), controllers 11, input/output (I/O) cards 26 and 28, wired communication networks 23, wireless communication networks 70, and supervisory system communication networks 72. The wired communication network 23, which may operate according to an industrial automation protocol (e.g., HART, PROFIBUS DP (Decentralized Peripherals), etc.) or another suitable communication protocol, includes wired field devices 15-22. The controller 11 is communicatively coupled to the field devices 15-22 using any suitable hardware and software associated with, for example, standard 4-20 ma devices and/or any smart communication protocol such as the Fieldbus or HART protocols. The field devices 15-22 may be any types of devices, such valves, valve positioners, switches, sensors (e.g., temperature, pressure, vibration, flow rate, or pH sensors), pumps, fans, etc., or combinations of two or more of such types, while the I/O cards 26, 28 may be any types of I/O devices conforming to any suitable communication or controller protocol such as HART, Fieldbus, Profibus, etc. Field devices 15-22 perform control, monitoring, and/or physical functions within a process or process control loop, such as opening or closing valves or taking measurements of process parameters, for example. In the embodiment illustrated in FIG. 1, the field devices 15-18 are standard 4-20 ma devices that communicate over analog lines to the I/O card 26, and the field devices 19-22 are smart devices, such as Fieldbus field devices, that communicate over a digital bus to the I/O card 28 using, for example, Fieldbus protocol communications. Of course, the field devices 15-22 and the I/O cards 26, 28 could conform to any other suitable standard(s) or protocols besides the 4-20 ma, HART or Fieldbus protocols, including any standards or protocols developed in the future.

The wireless communication networks 70, which may operate in accordance with the present disclosure, may include wireless devices 40-58, which include wireless field devices 40-46, wireless adapters 52a and 52b, access points 55a and 55b, and router 58. The wireless adapters 52a and 52b may be connected to non-wireless field devices 48 and 50, respectively. The controller 11 may include a processor 30, a memory 32, and one or more control routines 38 which may be stored in the memory 32 and may be executed by the processor 30. Though FIG. 1 depicts only a single one of some of the devices connected to the network backbone 105, it will be understood that each of the devices could have multiple instances on the network backbone 105 and, in fact, that the process plant 10 may include multiple network backbones 105.

The host devices, such as the server 150 and/or the HMI device 114, may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1, the controller 11, the field devices 15-22 and the I/O cards 26, 28 are wired devices, and the field devices 40-46 are wireless field devices.

The processor 30 of the controller 11 implements or oversees one or more process control routines, such as one or more process routines 38, stored in a memory 32, which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the HMI device 114 in combination with the server 150. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 114 in certain embodiments) to implement a control strategy or control routine in any desired manner.

In addition to, or instead of, the wired network 10 and/or the wireless network 70, the process control network 100 may include a central or distributed supervisory network or system, such as the supervisory control and data acquisition (SCADA) network 72, which may include one or more RTUs 80 that enable communication between the host (e.g., the sever 150) and remote field devices. In the embodiment of FIG. 1, the process control network 100 includes several RTUs 80 communicating with field devices 92-96. The RTU 80*a* is coupled to the backbone 105 directly, via a wired connection, and the RTUs 80*b*, 80*c*, and 80*d* form a wireless network that is coupled to the backbone 105 via a SCADA gateway or router 36. Each RTU 80 may include a network interface that enables the RTU 80 to communicate with a host device, such as the server 105 and/or the HMI device 114. The RTUs 80 may communicate with the host devices using any suitable wired or wireless communication protocols, such as the FOUNDATION® Fieldbus protocol, the HART® protocol, the Wireless HART® protocol, etc. Each RTU 80 also includes a processor 82 and a memory 83. The memory 82 of an RTU 80 may store a configuration profile of the RTU 80 and/or one or more routines (e.g., control routines) that may be performed by the RTU 80. The processor 82 of the RTU 80 may implement the one or more routines stored in the memory 83 of the RTU 80 to control one or more field devices connected to the RTU 80 and/or collect data from the one or more devices connected to the RTU 80. It should be understood that while only four RTUs 80 and only five field devices 92-96 are illustrated in FIG. 1, the network 72 may include any number of RTUs 80 and field devices 92-96. For example, the network 72 may include hundreds or even thousands of RTUs 80 and/or hundreds or even thousands field devices 92-96, in at least some embodiments.

Host devices, such as the server 150 and/or the HMI device 114 may communicate with the RTUs 80 and/or the controller 11, for example to obtain real-time process data from the field devices 92-96, 15-22, and 40-46, to configure (or re-configure) the RTUs 80 and/or the controller 11, to configure or reconfigure the field devices 92-96, 15-22, and 40-46 via the RTUs 80 and the controller 11, to control operation of the field devices 92-96, 15-22, and 40-46 via the RTUs 80 and the controller 11, etc. To enable the server 150 to perform these and other actions with respect to the devices within the process control network 100 and/or processes monitored and/or controlled by the process control network 100, the server 150 may include certain routines or modules, each of which may be in the form of computer readable instructions stored in a memory of the server 150 and executable by a processor of the server 150, that enable various calculation operations, process control operations (e.g., setting or adjusting set points, opening or closing valves, etc.), configuration operations with respect to the controller 11 and/or the RTUs 80 (e.g., downloading a configuration or a control routine to an RTU 80 or to the controller 11, uploading a configuration or a control routine from an RTU 80 or the controller 11), interface operations with the HMI device 114 (e.g., sending process data for display at the HMI device, sending alarm data to the HMI device, etc.), etc.

In an embodiment, the server 150 includes an action engine that allows a user to easily configure workflows that enable the server 150 to perform certain defined actions or certain defined sequences of actions to be performed automatically without additional operator input. The action engine may allow an operator to create such workflows without any knowledge or with only minimal knowledge of any programming language or scripting language. To this end, the action engine may provide a user with a set of predefined steps or building blocks and may allow the user to create a workflow composed of a sequence of one or more of the steps or the building blocks. The steps or the building blocks may be associated with expressions, such as mathematical expressions, logical expressions, string expressions, date/time expressions, action engine specific expressions, etc. The expressions may conform to a certain format or syntax that may then be interpreted by a parser configured to parse the expressions based on the format or syntax. Alternatively, the steps or building blocks may be any suitable objects (e.g., executable objects, dynamic-link library (DLL) objects, etc.) that may implement actions that the server 150 may take with respect to other devices, with respect to data collected from the other devices, with respect to data calculated by the server 150, etc.

In this fashion, the action engine 152 may abstract the routines or modules that the server 150 uses to perform actions from the steps that an operator may use to define workflows to be executed in the server 150, for example to effect communication between the server 150 with other devices, such as the RTUs 80, the controller 11, the HMI 114, etc. As just an example, a user may create a workflow that enables the server 150 to automatically download a configuration file to an RTU 80 in response to detecting that the RTU 80 has lost its configuration, such as when the RTU 80 has been replaced by a new RTU device, for example. As another example, a user may create a workflow that will enable the server 150 to automatically perform set-point adjustments in a field device or in a group of field devices, for example in response to detecting a change in a process variable or a change in a combination of process variables for which such set-point adjustments may be necessary or desired.

In an embodiment, the action engine 152 allows an operator to create workflows that enable the server 150 to automatically perform data analysis and alarm generation and/or management based on data collected via the process control network 100. For example, one or more workflows may be created that may enable the server 150 to monitor alarms that are currently active in the process control system. The one or more workflows may be configured to escalate an active alarm, for example by automatically changing importance and/or display of the alarm, by automatically changing alarm configuration to make the alarm visible to appropriate plant personnel, etc., if the alarm has not been dealt with within a certain period of time. Conversely, one or more workflows may be created to enable the server 150 to suppress (e.g., deactivate or reduce importance of) certain alarms, for example if these alarms resulted from other alarms in the system and may not represent actual problems detected in the system.

Data and/or alarm analysis may include analysis of historical data and/or historical alarms stored in the database. For example, one or more workflows may be created to enable the server 150 to create certain data sets, for example to be used in reports that may then be provided to operators or other users. As another example, one or more workflows may be created to enable the server 150 to analyze historical data to search for certain patterns or certain (e.g., unusual) values. When such patterns or values are identified, a workflow may communicate the identified patterns or values to an operator, for example. As another example, one or more workflows may be created to enable the server 150 to search the database to identify certain values or conditions, for example by conducting a non-intrusive (e.g., slow) background queries, and to rearrange identified data such that the data can be accessed by other systems (e.g., maintenance applications or other applications) more quickly.

As another example, one or more workflows may be created to enable the server 150 to apply defined sets of rules to data, for example to identify sets of data that deviate from the rules. For example, if the process control system 10 includes oil/gas wells, rules can be applied to data corresponding to each of the wells to identify one or more best performing wells and/or one or more worst performing wells. This information may be used to optimize the system, for example by examining the identified wells. In some systems, well optimization may be incorporated into workflows created by the action engine 152 so that automatic well optimization may be performed. Automatic optimization may include, for example, workflows to automatically modify well parameters and to send the new well parameters to corresponding RTUs.

As another example, one or more workflows may be created that may enable the server 150 to monitor and/or analyze currently active and/or historical alarms in the process control system to detect or identify certain user-defined trends in the alarms. The one or more workflows may further enable the server 150 to automatically set certain defined values in the database to indicate the identified or detected trends. Additionally or alternatively, data related to detected or identified trends may be used by the process control system (e.g., by an operator of the process control system) to identify short term or long term problems within the system (e.g., performance problems associated with certain field device of devices) and/or to identify ways to improve and/or optimize the process control system. As another example, one or more workflows may be created to enable the server 150 to automatically create work items based on certain conditions detected in the process control system. The server 150 may generate such work items based on detecting certain user-defined conditions within the database, for example. The one or more workflows may further enable the server 150 to automatically assign work items to certain personnel and to provide the work items to the assigned personnel.

One or more workflow routines or steps may be provided to enable the server 150 to interact with plant operators and personnel in a variety of manners. For example, one or more workflow routines or steps may enable the server 150 to create "notes" when certain conditions or changes in the database are detected, and to provide these notes to an operator via an HMI device, such as the HMI device 114. As another example, one or more workflow routines or steps may enable the server 150 to interact with an operator by automatically opening windows on an HMI device, such as the HMI device 114 (e.g., to inform plant personnel when a certain alarm or certain alarms have been escalated and/or require immediate attention). One or more workflows may also include steps for displaying a dialog window on an HMI device to allow a user to manually interact with a workflow, for example to confirm certain action before the actions are actually performed by the server 150 or by displaying certain procedures that should be followed by an operator in an event that a certain alarm is generated. A workflow may also include a step to create records of alarms and to store the records in a memory so that the alarms can be analyzed at a later time, such as during post-incident analysis. The action engine 152 may further include one or more expressions or steps that may allow a user set up triggers for automatic notifications, such as electronic mail (e-mail notifications), short message service (SMS) notifications and the like to be sent to plant operators or other personnel. Additionally or alternatively, the action engine 152 may be configured to accept e-mails, SMS messages and the like, for example via a POP3 server. In an embodiment, the action engine 152 may include one or more steps or expressions that enable the user to incorporate e-mails, SMS messages and the like into steps of workflow templates.

In an embodiment, the action engine 152 may be configured to interact with an operating system of the server 150, for example to detect certain conditions related to operation of the operating system. For example, the action engine 152 may allow a user to create one or more workflow to monitor system resources on the server 150, to monitor certain folders or files on the sever 150, or to perform other actions related to or associated with the operating system of the server 150. In an embodiment, the action engine 150 may allow the user to create one or more workflows that may monitor resources of the server 150 to detect low resources in the system, and to initiate failover operations that may assist with disaster recovery of the system.

In an embodiment, the action engine 152 may be configured to allow a user to create one or more workflows to implement data management operations that may be needed or desired for the server 150. For example, one or more workflows may be created to enable the server 150 to move certain files (e.g., historical archive files) to and from data storage system external to the server 150 and/or external to the process control system. Further, one or more triggers may be defined to trigger the one or more data management workflows to be initiated, for example in response to detecting a change or changes in the database system.

In an embodiment, the action engine 152 is configured to operate as an object linking and embedding (OLE) for process control (OPC) client and may be able to communicate directly with an OPC server, for example to retrieve data from the OPC server.

With continued reference to FIG. 1, the wireless gateway 35 is an example of a provider device that may provide access to various wireless devices 40-58 of the wireless communication network 70. In particular, the wireless gateway 35 provides communicative coupling between the wireless devices 40-58 and other nodes of the process control network 100 (including the controller 11 of FIG. 1). Similarly, the wireless gateway 36 is an example provider device that provides access to the RTUs 80 of the supervisory (e.g., SCADA) network 72. The wireless gateway 35 and/or the wireless gateway 36 provides communicative coupling to respective devices, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 and/or the wireless gateway 36 may translate commands between wired and wireless protocols that do not share any protocol layers. In addition to protocol and command conversion, the wireless gateways 35, 36 may provide synchronized clocking used by time slots and superframes (sets of communication time slots spaced equally in time) of a scheduling scheme associated with the wireless protocol implemented in the communication network 70 and the communication network 72. Furthermore, the wireless gateways 35, 36 may provide network management and administrative functions for the communication network 70 and the communication network 72, such as resource management, performance adjustments, network fault mitigation, monitoring traffic, security, and the like.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 30, the field devices 48 and 50 may be connected to the wireless communication network 70 via a wireless adaptor (WA) 52*a* or 52*b*. Additionally, the wireless adaptors 52*a*, 52*b* may support other communication protocols such as Foundation® Fieldbus, PROFIBUS, DeviceNet, etc. Furthermore, the wireless network 30 may include one or more network access points 55*a*, 55*b*, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 30. The wireless devices 32-46 and 52-58 may communicate with each other and with the wireless gateway 35 over wireless links 60 of the wireless communication network 70.

Accordingly, FIG. 1 includes several examples of provider devices which primarily serve to provide network routing functionality and administration to various networks of the process control system. For example, the wireless gateway 35, the access points 55*a*, 55*b*, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as Wireless HART.

Similarly, the devices 92-26 of the network 72 may perform physical control functions within the process plant 10, e.g., opening or closing valves or take measurements of process parameters. The devices 82-96 may be monitored and/or controlled via host devices, such as the server 150 and/or the HMI device 114, by way communication between the RTUs 80 and the host devices via the network 72.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the host devices communicate over the process control network 100 using a wireless access point 72. In some scenarios, in host devices, one or more process control devices (e.g., controller 11, field devices 15-22, wireless devices 35, 40-58, RTUs 80) may also communicate using the wireless network supported by the access points 72.

Additionally or alternatively, the provider devices may include one or more gateways 75, 78 to systems that are external to the immediate process control system 10. In such embodiments, the host devices may be used to control, monitor, or otherwise communicate with said external systems. Typically, such systems are customers or suppliers of information generated or operated on by the process control system 10. For example, a plant gateway node 75 may communicatively connect the immediate process plant 10

(having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the host devices may be used to control, monitor, or otherwise communicate with systems or networks in said legacy or prior art process plant.

Figure 2:
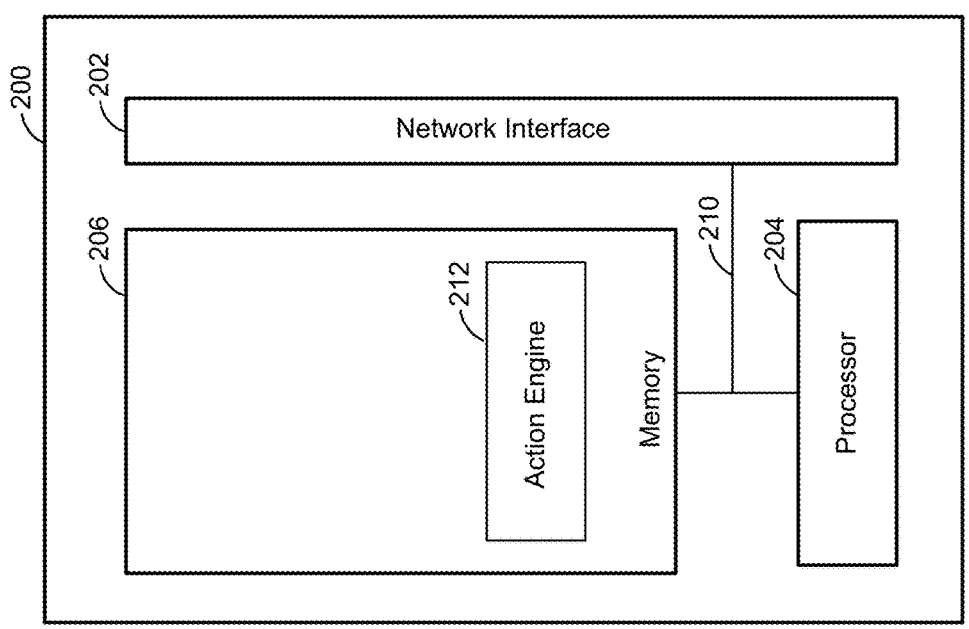
FIG. 2 is a simplified block diagram of an example host device, such as a server of the process control system of FIG. 1

FIG. 2 is a simplified block diagram of an example host device 200, such as the server 150 of FIG. 1, according to an embodiment. The host device 200 includes one or more network interfaces 202 that enable communication between the host device 200 and various other components of a process control network, such as communication between the host device 200 and the controller 11 and/or the RTUs 80 of the process control network 100 of FIG. 1. The host device 200 also includes a processor 204 and a memory 206. The one or more interfaces 202, the processor 204 and the memory 206 are interconnected by a system bus 210. An action engine 212 is stored in the memory 206. The action engine 212 may correspond to the action engine 152 in FIG. 1. The action engine 212, when executed on the processor 204, may allow a user to define custom workflows to be executed by the processor 204 to enable the host device 200 to automatically perform certain actions or certain sequences of actions defined within the workflows.

In an embodiment, the action engine 212 provides a user with a set of predefined steps, and allows the user to create a workflow template that includes one or more of the steps. The steps may correspond to actions that a host device may take with respect to other devices in the system, calculations that the host may perform to make certain decisions, data manipulation actions, for example for displaying certain data in a certain format to an operator, or any other action or operation that may be required or desired in operation of a process plant. Data that may be analyzed or otherwise used by a workflow may be real-time data received from RTUs, controllers, or other devices operating the process control system, or may be real-time data or previously collected data stored in a database (e.g., in the data system 102 of FIG. 1, in a database that is part of the server, a combination thereof, etc.). In an embodiment, the action engine itself may be stored in a database such as a database in the data system 102 of FIG. 1 or in a database that is part of the host device 200, thereby benefiting from internal redundancy mechanisms that are typically implemented in such database systems. Further, the action engine 212 may be a part of a configuration application that an operator may generally use to configure, control and/or monitor the process control system, allowing the operator to create and manage the action engine workflows without switching to a different software application, such as a programming, scripting or compiling applications.

As an example, a user may generate a workflow that includes the steps of obtaining a process variable, comparing the process variable to a predetermined threshold, generating a journal entry if the process variable exceeds the threshold, generating an alarm indication, and displaying the alarm to an operator via an operator display device or a user interface device. Once the user has created a workflow template, the user may create one or more instances of the workflow and may customize these instances with certain parameters, for example such that the different instances correspond to different RTU or controller devices. The defined workflow can then be applied to the different RTU or controller devices, eliminating the need to replicate the workflow for each of the different RTUs or controller devices. Further, if a workflow is changed or altered (e.g., a step of the workflow is changed or deleted, a new step is added, a variable is changed, etc.) the change may automatically be propagated to all of the workflow instances corresponding to the template. Accordingly, when a particular instance of the workflow template is triggered in the host device 200, the new or altered workflow may be executed.

Figure 3:
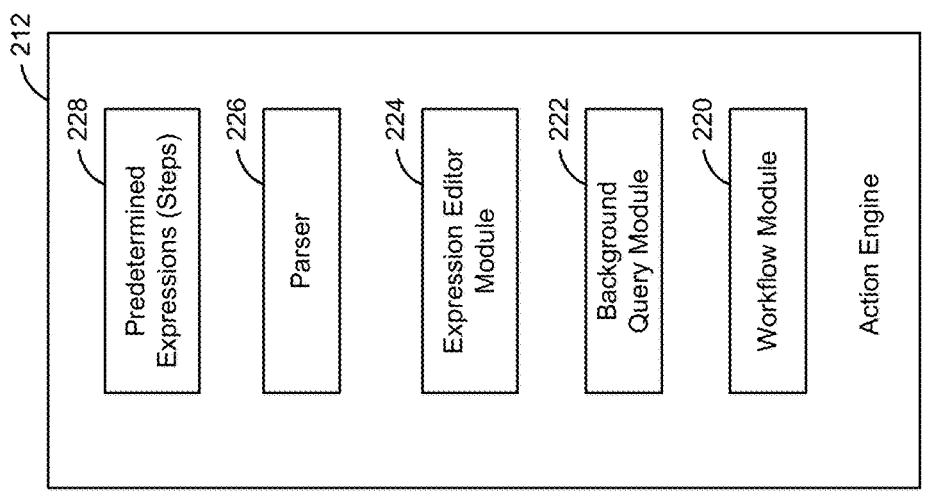
FIG. 3 is a block diagram of an example implementation of an action engine.

Turning now to FIG. 3, FIG. 3 is a block diagram of an example implementation of the action engine 212, according to an example embodiment. In the embodiment of FIG. 3, the action engine 212 includes several routines or modules that enable operation of the action engine 212. Each of the routines or modules comprises a set of computer readable instructions stored in a memory (e.g., the memory 206 of FIG. 2) that, when executed on a processor (e.g., the processor 204 of FIG. 2) cause the processor to implement the various components of the action engine 212. In the embodiment of FIG. 3, action engine 212 includes a workflow module 220, a background query module 222, and an expression editor module 224. Additionally, the action engine 212 may include a parser 226 and a set of predetermined expressions or steps 228. The set of predetermined expressions or steps 228 may include various preconfigured expressions that may be used to create workflow templates. The set of preconfigured expressions may include expressions provided with (e.g., initially included in) the action engine 212 and/or expressions created using the action engine 212, for example by using the expression editor module 224, as will be explained in more detail below. The workflow module 220 may enable a user to create workflow templates, wherein a workflow template may include one or more expressions or steps selected from the set of predetermined expressions or steps 228. The workflow module 220 may also enable a user to create one or more instances of workflows corresponding to a workflow template, and may allow the user to configure triggers to trigger execution of the created workflow instances. The workflow module 220 may also provide a user interface that may be displayed to a user via a user interface device (e.g., HMI device 114 of FIG. 1) to enable the user to define workflow templates and to create workflow instances. As will be explained in more detail below, execution of a workflow instance may be triggered at a certain user-scheduled time or times (e.g., repeated with a certain time period), or may be triggered in response to detecting a change in a value or values of certain parameters and/or database fields. For example, the background query module 222 may allow a user top define database queries. One or more background queries may then be associated with a workflow instance and may trigger execution of the workflow instance when a value change of certain data (e.g., of one or more database fields) within the scope of the background query is detected.

Figure 4:
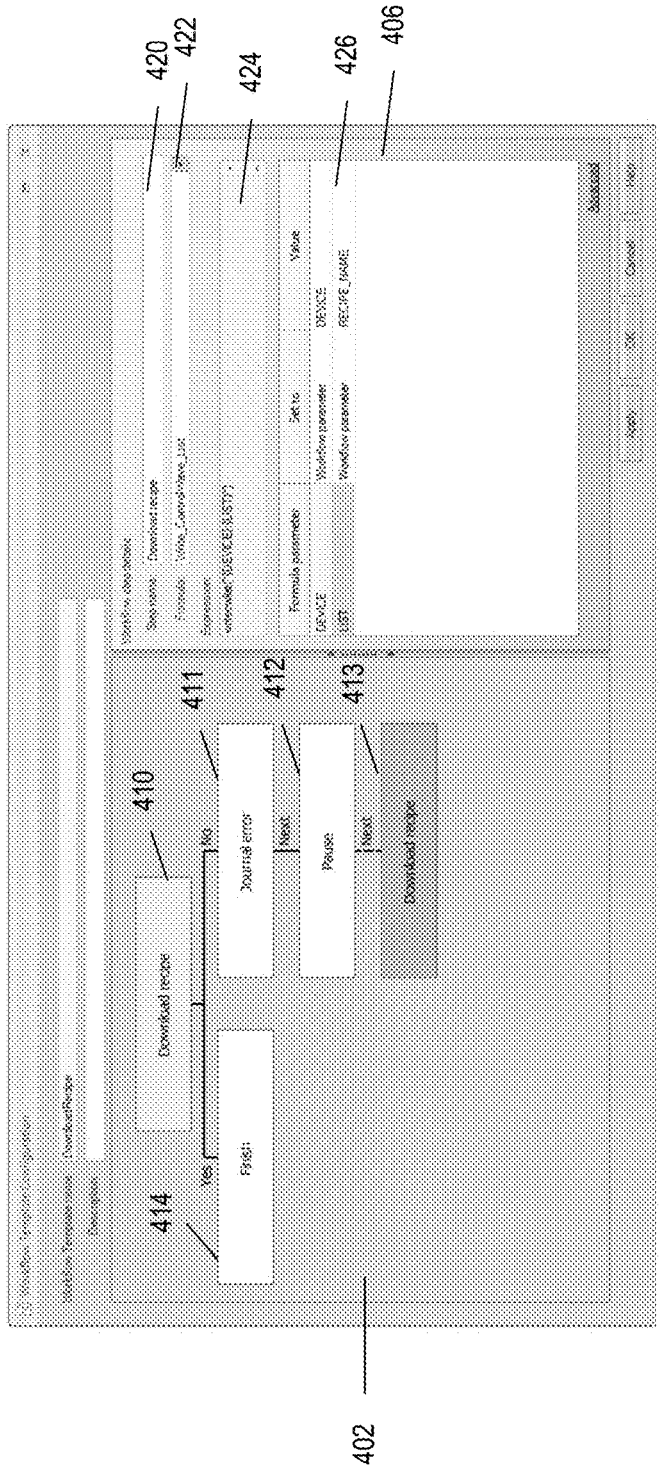
FIG. 4 is an illustrative display that depicts a screen generated by a user interface module of the action engine of FIG. 3 to enable a user to generate a workflow template.

Turning now to FIG. 4, an illustrative display 500 depicts a screen that may generated by a user interface component of an action engine to enable a user to create a workflow. The display 400 may be generated by a user interface component of the workflow module 220 of FIG. 2, for example. The display 400 includes a pane 402 that provides a visual illustration of a workflow template being created, and a pane 406 that allows a user to define the steps of the workflow template by selecting a specific step or expression for each of the steps of the workflow template, and to specify various parameters of the expressions selected for the workflow template. The pane 402 may allow a user to create any suitable number of steps to be included in a workflow template, and may also allow a user to define linking between the steps. Each step may be represented by a box in the pane 402. Because a workflow template generally includes a least one step, when a user first opens a new template, the pane 402 may include a single box that represents a first step of the workflow template. A user may define one or more additional steps by right-clicking on a box corresponding to an already created step, and selecting an action corresponding to creating of an additional step. When a user right-clicks on a particular step, a menu may appear to allow a user to select the action to be taken with respect to the step or with respect to one or more other steps in the workflow template 400, such as a precious step or a following step in the workflow 400. Some example actions may include any actions from a set "insert step after," "insert step before," "add yes step," "add no step," "yes link to existing step," "no link to example step," and "remove step." The "add yes step," "add no step," step options may allow a user to create conditional branches following a step, wherein a particular branch may be selected based on a value returned by the step. As just an example, a value of logic zero ("0") returned by the step may select a "NO" branch and non-zero value (e.g., a value of logic one) may select the "YES" branch.)

The workflow template 404 includes a plurality of steps 410-414. A user may define various parameters of each of the steps 410-414 by entering the parameter values in the pane 406. For example, the user may provide a name for a step (e.g., the step 410) in a "step name" box 420 of the pane 406. The user may also select expressions for the steps 410-414 by using a drop menu in a "formula" box 422 of the pane 406. In the example of FIG. 4, the user provided a name "Download recipe" to a first step 410 of the workflow template 404, and selected an expression "Write_Control-Wave_List" for the first step 410. The selected expression may be made visible to the user in an "Expression" box 424. A formula parameter window 426 of the pane 406 may display parameters associated with the expression selected in the formula box 422, and may allow the user to select, for each parameter, a parameter type and a parameter value. The user may select, for each parameter, a parameter type from a set of predefined parameter types. The set of predefined parameter types may include one or more of "a constant value," "previous step result," "runtime value," and "workflow parameter." The constant value parameter type may signify that the value specified in the corresponding value field, which may be, depending on the particular parameter, a suitable numeric or alphanumeric value, will remain the same in every instance of the workflow template. The previous step result parameter type may signify that the current expression should fetch a result of previous step in the workflow, and use this result as the value of the current parameter. The runtime value parameter type may signify that a variable should be created for use in the current workflow at runtime for the corresponding parameter. The workflow parameter type may signify that the specific parameter value will be selected on an instance bases, e.g., when an instance of the workflow template 400 is generated. Of course the set of predefined parameter types may include other parameter types and/or may omit one or more of the parameter types discussed above.

In the example of FIG. 4, the expression Write_Control-Wave_list is a two-parameter expression (i.e., two parameters are associated with this expression). A first parameter associated with the Write_ControlWave_list expression is a "device" parameter that specifies a device (e.g., an RTU) to which a list is to be downloaded, and a "list" parameter that specifies the recipe (e.g., a file name of a file that contains the recipe) that is to be downloaded to the device. In the illustrated embodiment, the user selected each of parameters of the Write_ControlWave_list selected for the step 410 to be a "workflow parameter" type. Accordingly, a user will select the specific parameter values for these parameters when the user generates a particular instance of the workflow template.

Continuing with the example workflow template of FIG. 4, the download recipe step 410 is followed by conditional branches, specifically a "no" branch 430 that includes the steps 411-413 and a "yes" branch 432 that includes the step 414. During execution, the "no" branch 430 or the "yes" branch 422 may be selected based on the result of execution of the step 410. For example, a successful recipe download may return a value of logic one. Based on this value, the "yes" branch 432 may be selected. The branch 432 may include a step a "finish" to end the workflow (step 413). On the other hand, an unsuccessful recipe download may return a value other than a logic one (e.g., a logic 0 or another value). In this case, the "no" branch 430 may be selected. The branch 430 may include a step to create a journal entry logging the unsuccessful recipe download (step 411), a "pause" step that may define a certain period of idle time, followed by another download recipe step (step 413). The download recipe step 413 may refer back to the step 410 and may trigger execution of the workflow beginning with the step 410.

Figure 5:
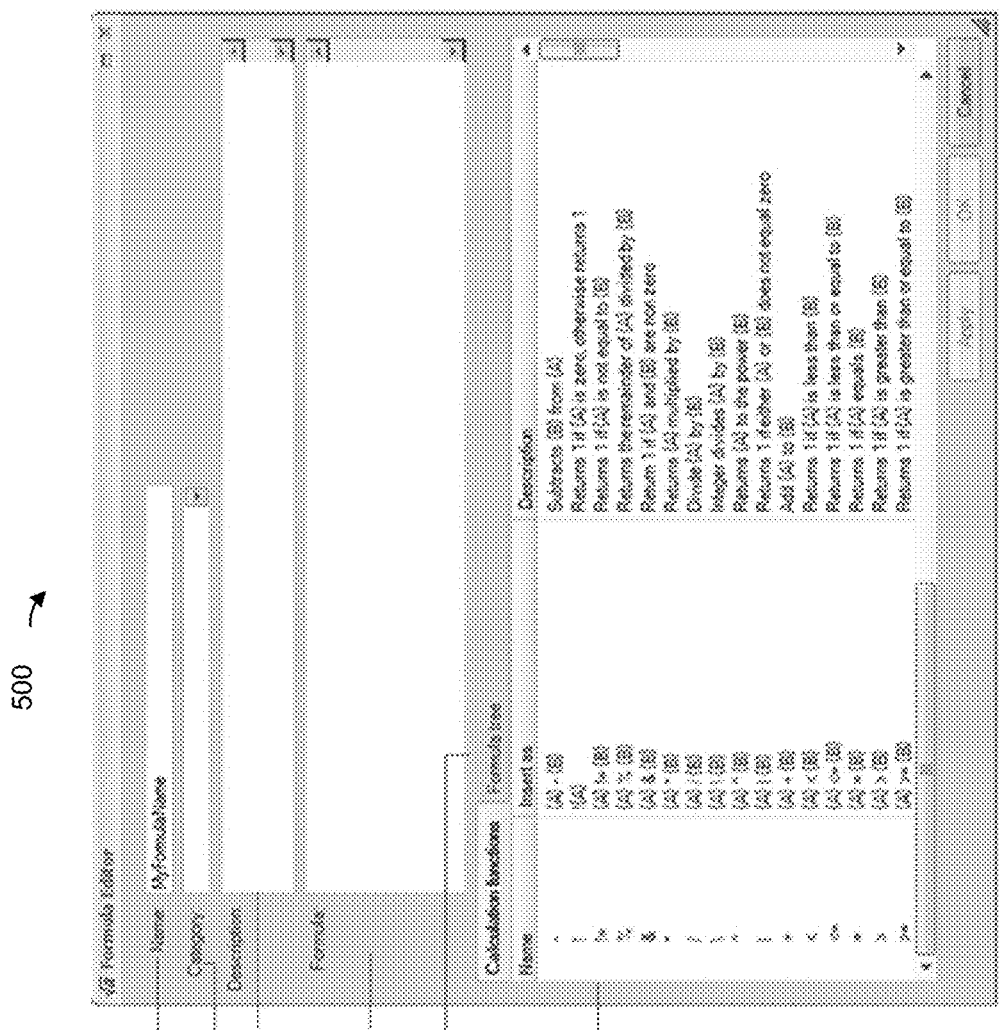
FIG. 5 is an illustrative display that depicts a screen generated by a user interface module of the action engine of FIG. 3 to enable a user to create a custom expression.
Figure 6:
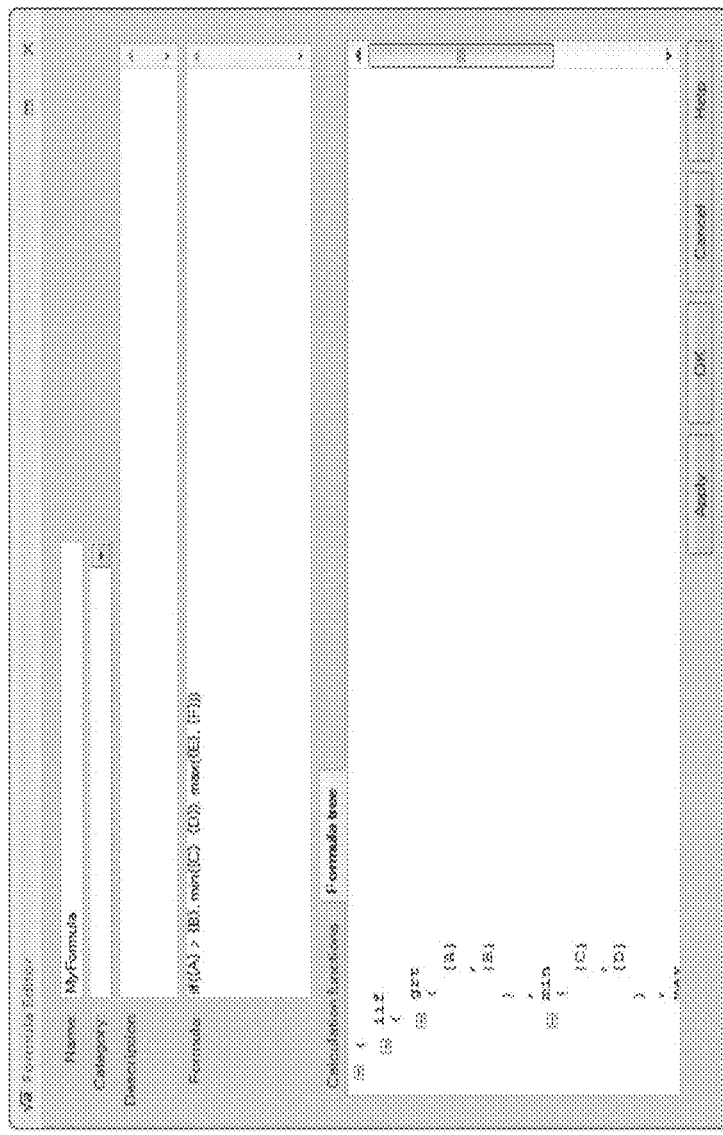
FIG. 6 is an illustrative display that depicts another screen generated by a user interface module of the action engine of FIG. 3 to enable a user to create a custom expression.

Referring now to FIG. 5, an illustrative display 500 depicts a screen that may be generated by a user interface component of an action engine to enable a user to create a custom expression. The display 500 may be generated by a user interface component of the expression editor module 224 of FIG. 2, for example. The display 500 includes a portion 502 that includes a "functions" tab and a "formula tree" tab. In FIG. 5, the functions tab is selected. With the functions tab selected, the portion 502 of the display 500 displays to a user a set of functions that the user can utilize to create a custom expression. Using the display 500, a user may define an expression by selecting one or more of these functions as building blocks to create the expression. Turning briefly to FIG. 6, FIG. 6 the display 500 is illustrated depicting an example expression that may be created by a user. The expression may be entered by the user into a "formula" window 510 and may also be displayed to the user in "formula tree" format via the "formula tree" tap of the portion 502. Once created, the expression can be saved, using an expression name provided by the user, and may then become available for selection in a workflow template. For example, the expression may become available in the set of steps provided for selection when a workflow template is being created or edited.

Figure 7:
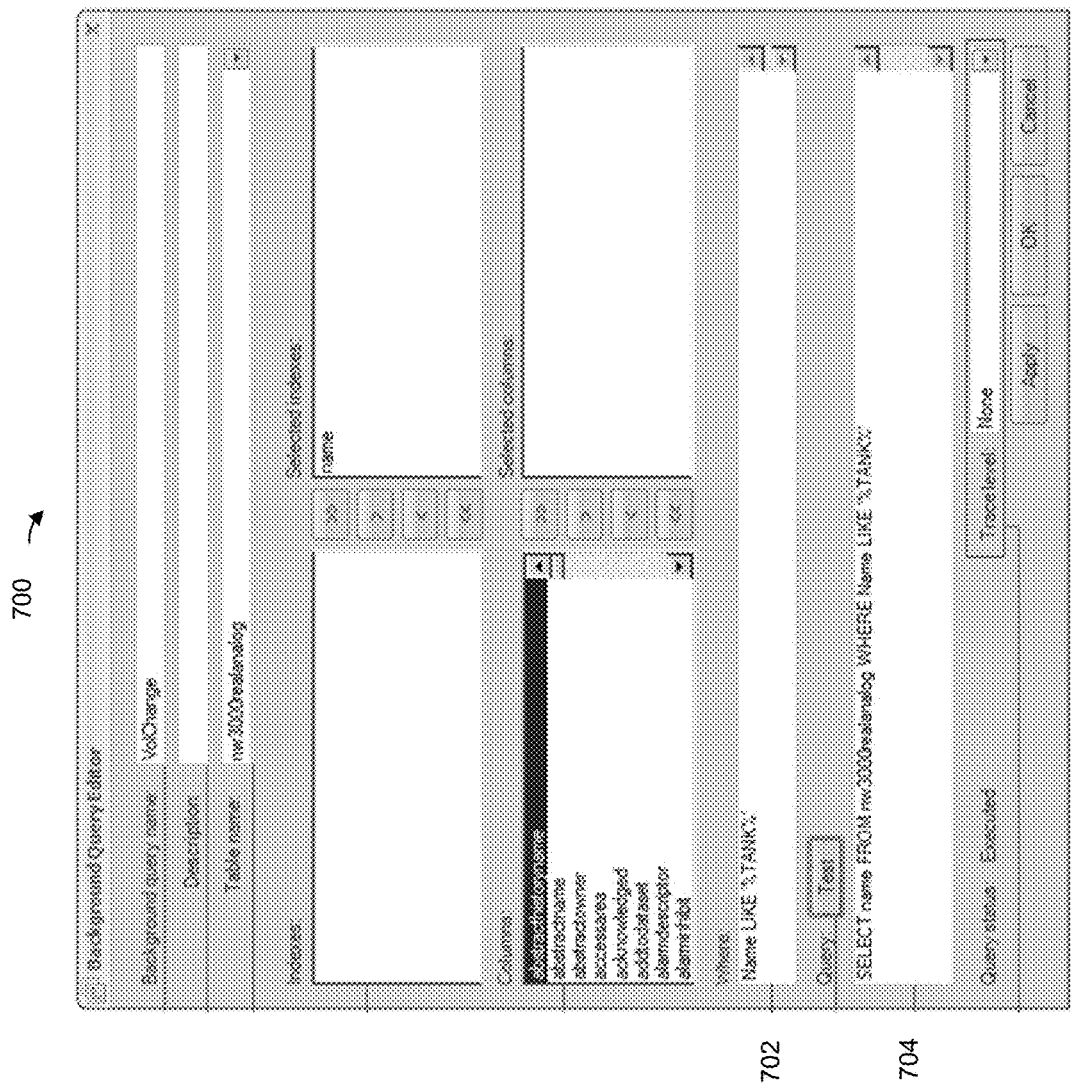
FIG. 7 is an illustrative display that depicts a screen generated by a user interface module of the action engine of FIG. 3 to enable a user to create a background query.

Turning briefly to FIG. 7, an illustrative display 700 depicts a screen that may generated by a user interface component of an action engine to enable a user to create a background query. The display 700 may be generated by a user interface component of the background query module 220 of FIG. 2, for example. The display 700 may allow a user to select a table name in the database by selecting the table name from a dropdown menu, for example. The user may also be able to narrow the scope of the query by specifying certain indices or columns to be queried in the selected table. The user may also be able to specify a variable name to be queries (e.g., by typing the variable name in a "Where" window 702). The user may also be able to test and verify the query by hitting a "Test" button 704. The user may further be able to specify a trace level identification for the query, for example by selecting the identification selecting any combination of one or more of: errors, warnings, information and debug. The specified identification may then be used in a container trace log to log a result of the query.

Figure 8:
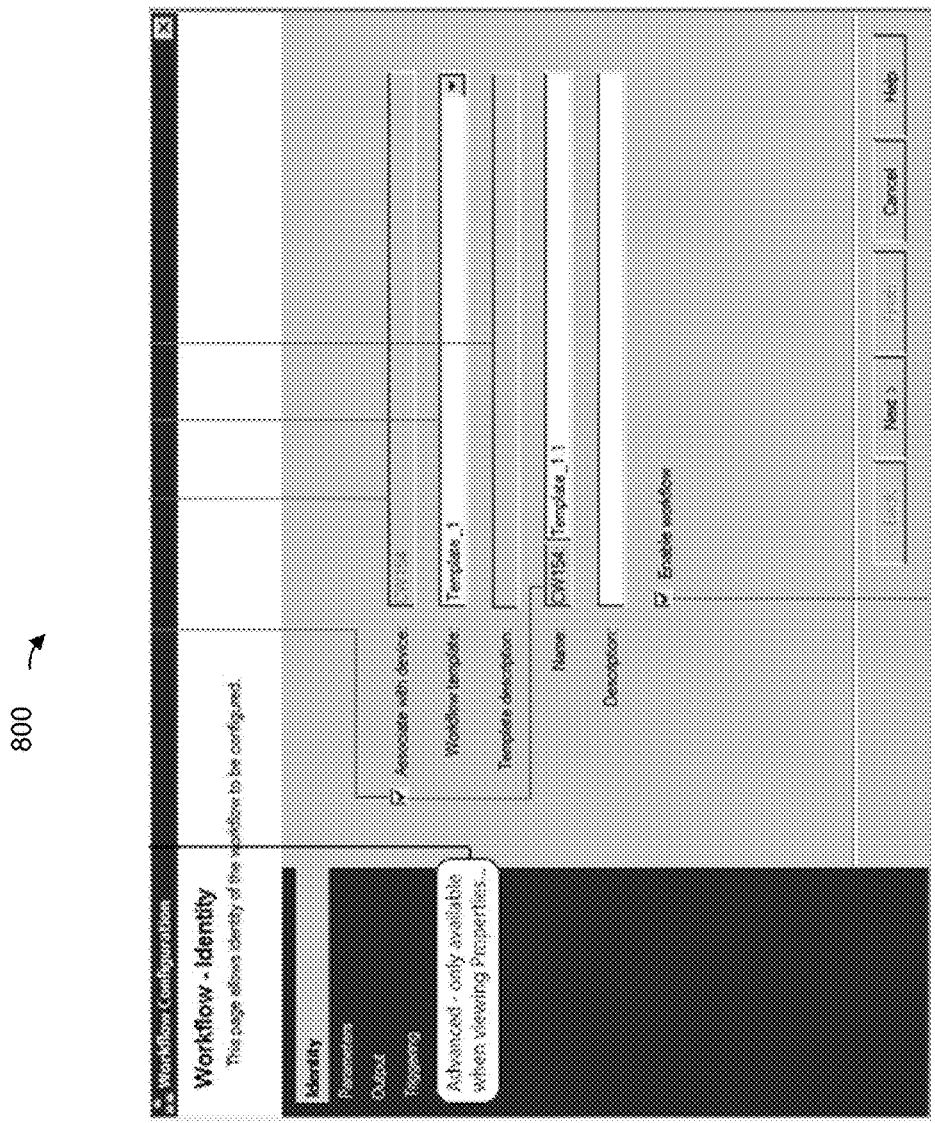
FIG. 8 is an illustrative display that depicts a screen generated by a user interface module of the action engine of FIG. 3 to enable a user to configure an instance of a workflow template.
Figure 9:
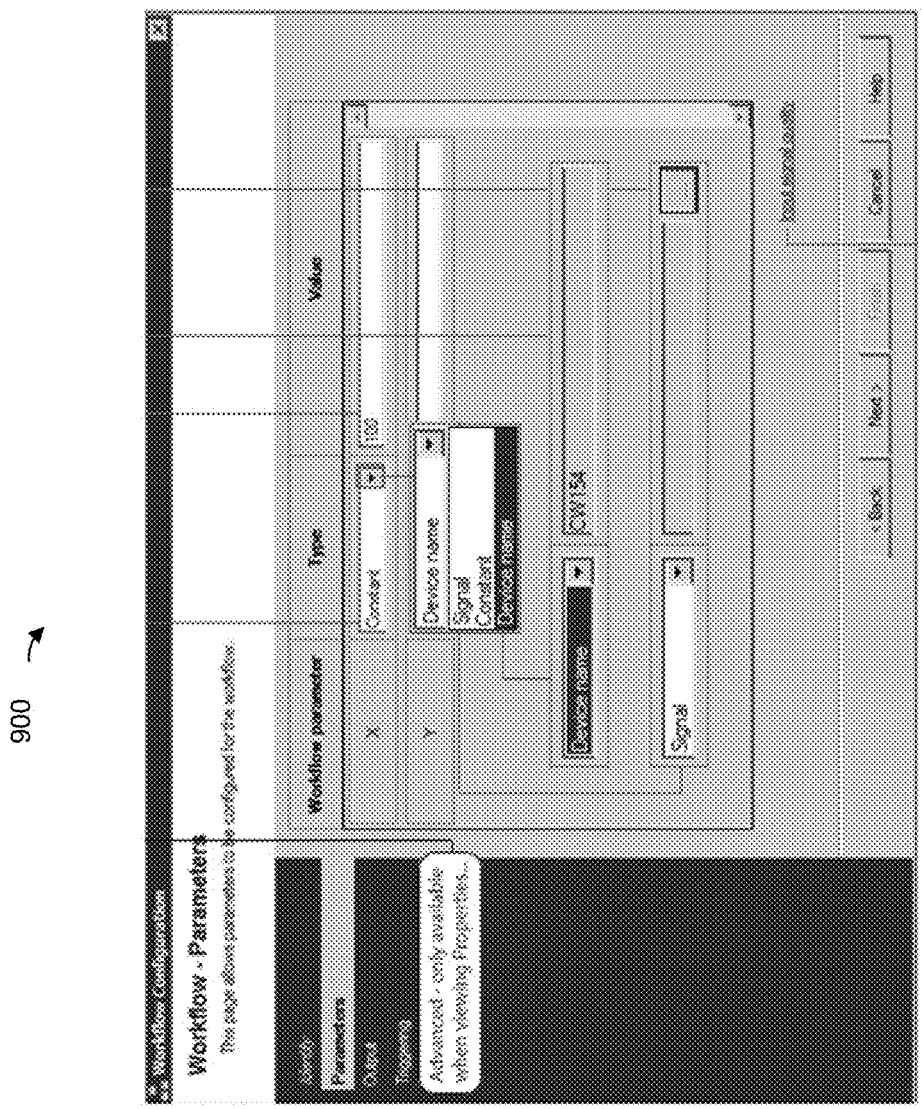
FIG. 9 is an illustrative display that depicts another screen generated by a user interface module of the action engine of FIG. 3 to enable a user to configure an instance of a workflow template.
Figure 10:
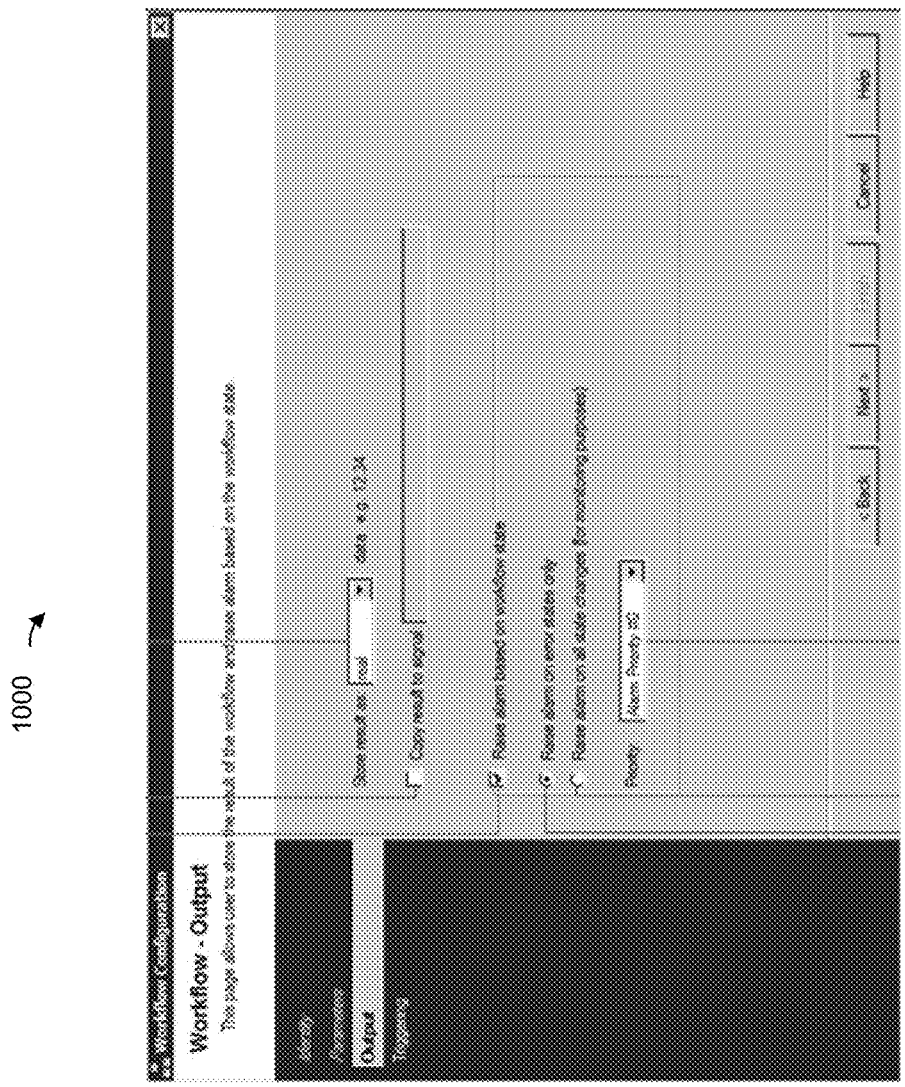
FIG. 10 is an illustrative display that depicts another screen generated by a user interface module of the action engine of FIG. 3 to enable a user to configure an instance of a workflow template.
Figure 11:
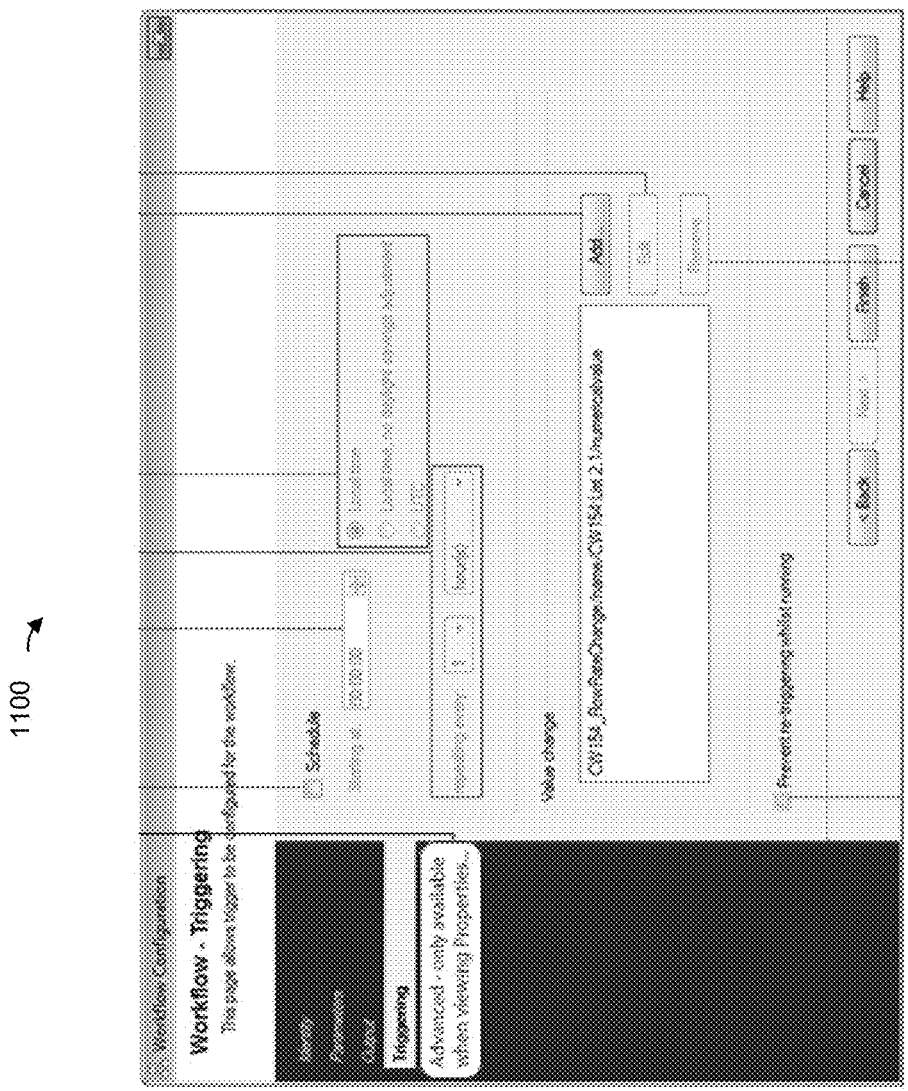
FIG. 11 is an illustrative display that depicts another screen generated by a user interface module of the action engine of FIG. 3 to enable a user to configure an instance of a workflow template.

FIGS. 8-11 depict illustrative displays that may generated by a user interface component of an action engine to enable a user to create an instance of a workflow. The illustrated displays may be generated by a user interface component of the workflow module 220 of FIG. 2, for example. Turning first to FIG. 8, a display 800 for identifying a workflow template for which an instance is to be created is depicted. A user may select a workflow template form a set of available workflow templates by using a dropdown menu in a box 802. Referring now to FIG. 9, a display 900 provides the user with any parameters of type "workflow parameter" associated with the workflow template that the user identified at the display 800. Using the display 900, the user may provide a value for each of the depicted parameters, thereby customizing the particular instance of the workflow. Referring now to FIG. 10, a display 1000 allows a user to specify output settings for the workflow instance. The display 1000 may also allow the user to define an alarm that can be generated based on a result of execution of the workflow instance. For example, the user may specify that an alarm should be generated if execution of the workflow instance generates an error state. Alternatively, the user may specify that an alarm should be generated if execution of the workflow instance results in any state change in the system, for example for monitoring of the system. Additionally, the user may be able to specify an alarm priority of the alarm. Turning now to FIG. 11, a display 1100 allows a user to specify trigger conditions for the workflow instance. As discussed above, a trigger condition may be based on scheduled time, such as one or more of starting at a specified time, repeating with a specified period, etc. and/or may be based on a value change, such as value changes in one or more database fields (e.g., generated by a background query).

Figure 12:
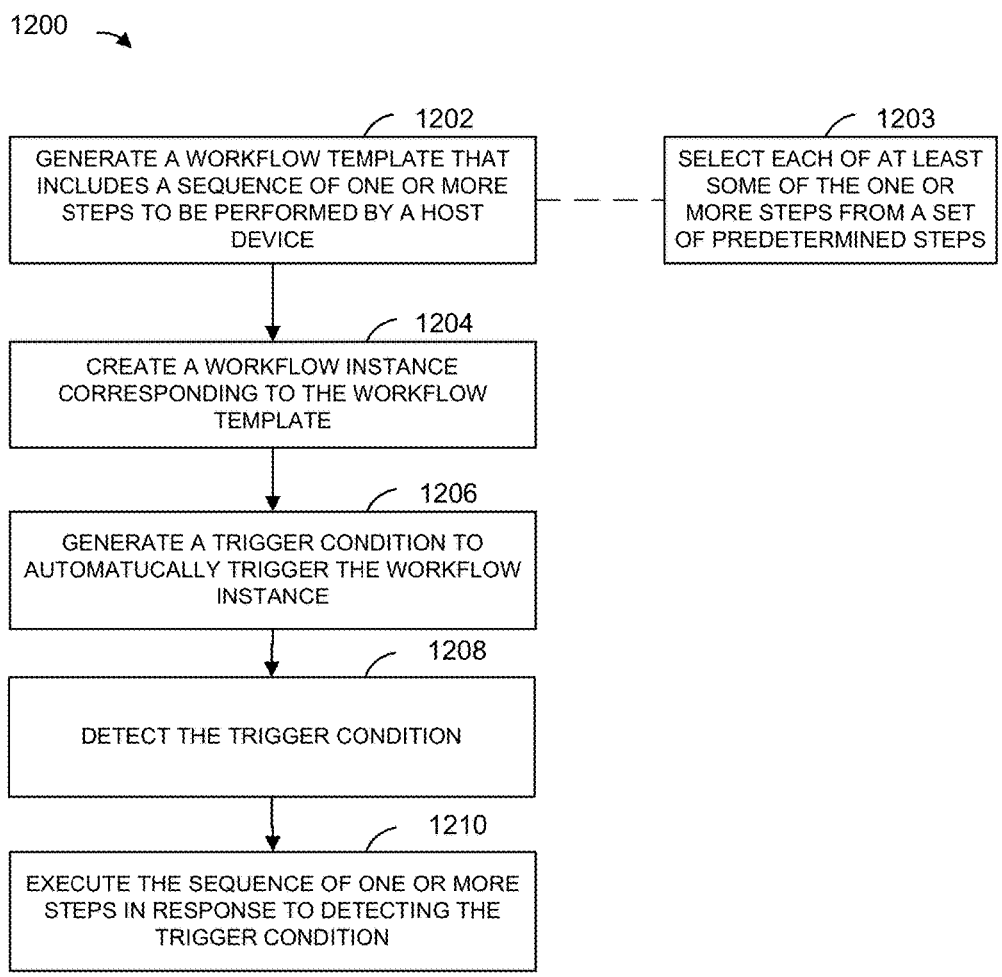
FIG. 12 is a flow diagram of an example method for configuring a host device in a process control plant to automatically perform an action or a set of actions.

A flow diagram in FIG. 12 depicts a method 1200 for configuring a host device in a process control plant to automatically perform an action or a set of actions. The method 1200 is a computer-implemented method implemented by software instructions stored on a computer-readable medium (excluding transitory signals) and executed by a processor of, for example, the server 150, the HMI device 114 or the host device 200. A workflow template is generated (block 1202). The workflow template includes a sequence of one or more steps to be performed by the host device. Each of at least some of the one or more steps is selected from a set of predetermined steps (block 1203). A workflow instance corresponding to the workflow template is generated (Block 1204). A trigger condition to trigger to trigger execution of the workflow instance is generated (block 1208). In response to detecting the trigger condition, the sequence of one or more steps is executed (block 1210).

It is noted that in embodiments, some of the steps recited above in connection with the method 1200 are omitted, combined, supplemented, or reordered.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method of configuring a host device in a process control plant to automatically perform an action or a set of actions to control a process, the method comprising:
   providing a field device including a setpoint and coupled to the process;
   generating, at the host device, a workflow template that includes a sequence of one or more steps to be performed by the host device, including selecting each of at least some of the one or more steps from a set of predetermined steps;
   creating, at the host device, an instance of the workflow template at the host device;
   generating, at the host device, a trigger condition to automatically trigger the instance workflow;
   detecting the trigger condition; and
   executing, at the host computing device, the sequence of the one or more steps in response to detecting the trigger condition, wherein the one or more steps in the workflow template enable the host device to adjust the setpoint of the field device coupled to a remote terminal unit (RTU) in response to determining, based on data received from the RTU, a change in a process parameter associated with the field device.

2. The method of claim 1, wherein the one or more steps in the workflow template enable the host device to communicate with the remote terminal unit to enable communication between the host device and the field device, wherein the workflow template enables the host device to perform one of (i) upload a configuration profile from the RTU or (ii) download a configuration profile to the RTU.

3. The method of claim 1, wherein the workflow template further includes one or more steps that enable the host device to generate an alarm indication in response to detecting the change in the process parameter and to transmit the alarm indication to a user interface device.

4. The method of claim 1, wherein a step of the one or more steps corresponds to an expression that conforms to a syntax, and wherein executing the sequence of one or more steps includes:
parsing the expression based on the syntax to identify one or more routines, wherein the one or more routines are stored in a memory associated with the host commuting device, and
executing the one or more identified routines.

5. The method of claim 4, wherein the expression is associated with one or more parameters, and wherein generating the workflow template includes specifying one or both of i) a parameter type and ii) a parameter value for each of the one or more parameters.

6. The method of claim 4, wherein the expression is associated with at least one parameter of workflow parameter type, the method further comprising specifying respective values for the at least one parameter for respective instances of the workflow.

7. The method of claim 4, wherein the workflow template is a first workflow template, and wherein the method further comprises generating a second workflow template, wherein the second workflow template includes a step that triggers execution of an instance of the first workflow template.

8. The method of claim 4, further comprising defining a custom expression, wherein the custom expression conforms to the expression syntax; and wherein generating the workflow template includes including a step corresponding to the custom expression in the workflow template.

9. The method of claim 1, wherein a first steps of the one or more steps is a conditional step followed by a first branch and a second branch, wherein the first branch or the second branch is selected during execution of the workflow instance based on a result of execution of the first step.

10. A process control system for controlling a process, the process control system comprising:
a field device including a setpoint and coupled to the process;
a host device coupled to the field device and configured to communicate with one or more remote terminal units (RTUs) to one or both of (i) obtain data from the one or more remote terminal units and (ii) transmit data to the one or more RTUs, wherein the host device includes:
a non-transitory computer readable memory that stores a plurality of predefined steps; and
an action engine configured to:
generate a workflow template that includes a sequence of one or more steps, selected from the plurality of stored predefined steps, to be performed by the host device;
create a workflow instance corresponding to the workflow template;
generate a trigger condition to automatically trigger the workflow instance;
detect the trigger condition; and
initiate execution of the sequence of the one or more steps in response to detecting the trigger condition, wherein the one or more steps in the workflow template enable the host device to adjust the setpoint of the field device coupled to an RTU in response to determining, based on data received from the RTU, a change in a process parameter associated with the field device.

11. The process control system of claim 10, wherein the one or more steps in the workflow template enable the host device to communicate with the RTU to perform one of (i) upload a configuration profile from the RTU or (ii) download a configuration profile to the RTU.

12. The process control system of claim 10, wherein the workflow template further includes one or more steps that enable the host device to generate an alarm indication in response to detecting the change in the process parameter and to transmit the alarm indication to a user interface device.

13. The process control system of claim 10, wherein a step of the one or more steps corresponds to an expression that conforms to a syntax, and wherein the action engine is further configured to parse the expression to identify one or more routines, stored in the non-transitory computer readable memory or in another memory of the host device, the one or more routines for executing the step.

14. The process control system of claim 13, wherein the expression is associated with one or more parameters, and wherein generating the workflow template includes specifying one or both of i) a parameter type and ii) a parameter value for each of the one or more parameters.

15. The process control system of claim 13, wherein the expression is associated with at least one parameter of workflow parameter type, the action engine is further configured to accept respective values for the at least one parameter for respective workflow instances corresponding to the workflow template.

16. The process control system of claim 13, wherein the workflow template is a first workflow template, and wherein the action engine is further configured to generate a second workflow template, wherein the second workflow template includes a step that triggers execution of an instance of the first workflow template.

17. The process control system of claim 13, wherein the action engine is further configured to provide a user interface for generating a custom expression, wherein the custom expression conforms to the syntax; and wherein generating the workflow template includes including a step corresponding to the custom expression in the workflow template.

18. The process control system of claim 13, wherein a first steps of the one or more steps is a conditional step followed by a first branch and a second branch, wherein the first branch or the second branch is selected during execution of the workflow instance based on a result of execution of the first step.

* * * * *